(12) United States Patent
Ruocco (10) Patent No.: US 11,928,642 B2
(45) Date of Patent: Mar. 12, 2024

(54) DELIVERY LOCKBOX ASSEMBLY

(71) Applicant: Daniel Ruocco, Fresno, CA (US)

(72) Inventor: Daniel Ruocco, Fresno, CA (US)

( * ) Notice: Subject to any disclaimer, the term of this patent is extended or adjusted under 35 U.S.C. 154(b) by 245 days.

(21) Appl. No.: 17/528,489

(22) Filed: Nov. 17, 2021

(65) Prior Publication Data

US 2023/0153747 A1 May 18, 2023

(51) Int. Cl.
*G06Q 10/0836* (2023.01)
*A47G 29/14* (2006.01)
*G07C 9/00* (2020.01)

(52) U.S. Cl.
CPC ....... *G06Q 10/0836* (2013.01); *A47G 29/141* (2013.01); *G07C 9/00896* (2013.01); *A47G 2029/142* (2013.01)

(58) Field of Classification Search
CPC ............ G06Q 10/0836; G07C 9/00896; G07C 9/0069; G07C 9/00912; A47G 29/141; A47G 29/30; A47G 29/38; A47G 29/20; A47G 2029/142; A47G 2029/147; A47G 29/28; E06B 7/32
USPC .................................................. 232/31, 43.4
See application file for complete search history.

(56) References Cited

U.S. PATENT DOCUMENTS

| | | | | |
|---|---|---|---|---|
| 4,024,729 | A * | 5/1977 | Abate, Sr. | F25D 23/10 62/263 |
| 6,079,216 | A * | 6/2000 | de Marsillac Plunkett | A47G 29/20 312/286 |
| 6,204,763 | B1 * | 3/2001 | Sone | G06Q 10/087 340/5.1 |
| 6,415,552 | B1 * | 7/2002 | Khosropour | F25D 23/12 52/27 |
| 6,484,531 | B1 * | 11/2002 | Hambleton | F25D 23/10 312/286 |
| 10,264,906 | B2 | 4/2019 | Bloom | |
| D897,625 | S | 9/2020 | Hall | |
| 10,817,824 | B2 | 10/2020 | Richardson | |
| 11,172,776 | B1 * | 11/2021 | Logan | G08B 13/14 |
| 11,340,010 | B2 * | 5/2022 | Oh | F25D 17/06 |
| 11,378,329 | B2 * | 7/2022 | Oh | F25D 17/062 |
| 11,441,833 | B2 * | 9/2022 | Oh | F25D 23/028 |
| 11,448,456 | B2 * | 9/2022 | Oh | F25D 21/14 |
| 11,478,099 | B1 * | 10/2022 | Bates | A47G 29/141 |
| 11,587,382 | B1 * | 2/2023 | Valentine | G07C 9/00896 |

(Continued)

FOREIGN PATENT DOCUMENTS

WO WO2019108643 6/2019

*Primary Examiner* — William L Miller (57) ABSTRACT

A delivery lockbox assembly includes a lock box which has a recess to accommodate a foundation of a building. The lock box has a front entry which is positioned outside of the building to facilitate a parcel to be delivered into the lock box. The lock box has a back entry which is positioned within the building thereby facilitating the back entry to be accessible to an occupant of the building for retrieving the parcel. A locking unit is integrated into the front entry inhibit the parcel from is removed from the lock box by an unauthorized person. the locking unit has an access unit is integrated into the locking unit wherein the access unit is configured to be manipulated by the delivery person. The locking unit is in remote communication with a personal electronic device to alert the occupant that the parcel has been delivered into the lock box.

2 Claims, 8 Drawing Sheets

(56) References Cited

U.S. PATENT DOCUMENTS

| | | | |
|---|---|---|---|
| 2001/0035703 A1* | 11/2001 | Scholefield | F25D 23/10 |
| | | | 312/242 |
| 2001/0045449 A1* | 11/2001 | Shannon | G07C 9/21 |
| | | | 232/19 |
| 2004/0252018 A1* | 12/2004 | Shuster | G07F 17/13 |
| | | | 340/5.73 |
| 2004/0263029 A1* | 12/2004 | Scholefield | A47G 29/16 |
| | | | 312/242 |
| 2009/0101711 A1 | 4/2009 | Grayson | |
| 2016/0066733 A1 | 3/2016 | Gozar | |
| 2017/0213187 A1* | 7/2017 | Choi | H04N 7/181 |
| 2017/0251856 A1 | 9/2017 | Schaible | |
| 2018/0070753 A1* | 3/2018 | Eveloff | H04W 4/025 |
| 2019/0248582 A1* | 8/2019 | Nevison | A47G 29/20 |
| 2019/0254459 A1* | 8/2019 | Hengst | A47G 29/141 |
| 2020/0138225 A1* | 5/2020 | Martin | B65D 55/02 |
| 2020/0372441 A1 | 11/2020 | Ruffkess | |
| 2021/0005033 A1* | 1/2021 | Roman | G06Q 10/0833 |
| 2021/0059456 A1* | 3/2021 | Fontanilla | A47G 29/16 |
| 2021/0082219 A1* | 3/2021 | Kane | G07C 9/00182 |
| 2021/0106160 A1* | 4/2021 | Janas | A47G 29/30 |
| 2022/0039581 A1* | 2/2022 | Lee | A47G 29/30 |
| 2022/0058575 A1* | 2/2022 | Moudy | G07F 9/002 |
| 2022/0151419 A1* | 5/2022 | Lee | G06Q 10/083 |
| 2022/0155005 A1* | 5/2022 | Lee | G06Q 10/0832 |

\* cited by examiner

DELIVERY LOCKBOX ASSEMBLY

(c) STATEMENT REGARDING FEDERALLY SPONSORED RESEARCH OR DEVELOPMENT

Not Applicable

(b) CROSS-REFERENCE TO RELATED APPLICATIONS

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

(g) BACKGROUND OF THE INVENTION

(1) FIELD OF THE INVENTION

The disclosure relates to lockbox devices and more particularly pertains to a new lockbox device for securing a parcel delivery. The device includes a lock box which has a recess integrated into the lock box for accommodate a foundation of a building. In this way the lock box can be integrated into an exterior wall of the building for receiving a parcel delivery. The lock box includes a front entry that is positioned outside the building for receiving the delivery and a rear entry that is positioned inside the building to facilitate an occupant of the building to retrieve the parcel.

(2) DESCRIPTION OF RELATED ART INCLUDING INFORMATION DISCLOSED UNDER 37 CFR 1.97 AND 1.98

The prior art relates to lockbox devices including a variety of lock box devices that are positionable adjacent to an entry of a building for receiving a parcel delivery. In each instance the lock box devices include a variety of electro-mechanical locking means which can be unlocked with a pre-determined access code. In several instances the lock box devices are in electronic communication with an extrinsic communication network. In no instance does the prior art disclose a lock box with a recess for accommodating a foundation of a building along with a front entry and a rear entry.

(h) BRIEF SUMMARY OF THE INVENTION

An embodiment of the disclosure meets the needs presented above by generally comprising a lock box which has a recess to accommodate a foundation of a building. The lock box has a front entry which is positioned outside of the building to facilitate a parcel to be delivered into the lock box. The lock box has a back entry which is positioned within the building thereby facilitating the back entry to be accessible to an occupant of the building for retrieving the parcel. A locking unit is integrated into the front entry inhibit the parcel from is removed from the lock box by an unauthorized person. the locking unit has an access unit is integrated into the locking unit wherein the access unit is configured to be manipulated by the delivery person. The locking unit is in remote communication with a personal electronic device to alert the occupant that the parcel has been delivered into the lock box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
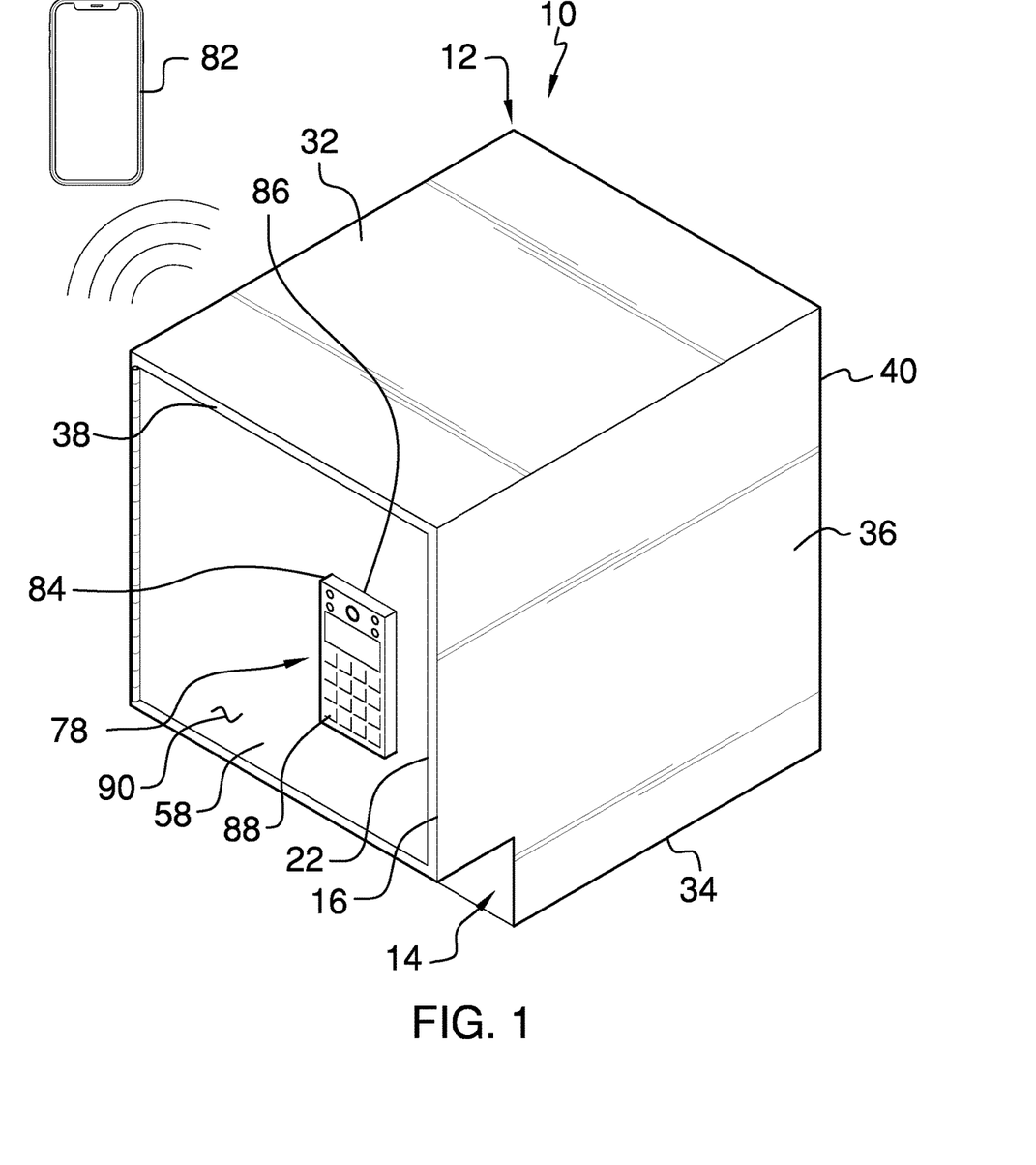
FIG. 1 is a front perspective view of a delivery lockbox assembly according to an embodiment of the disclosure.
Figure 2:
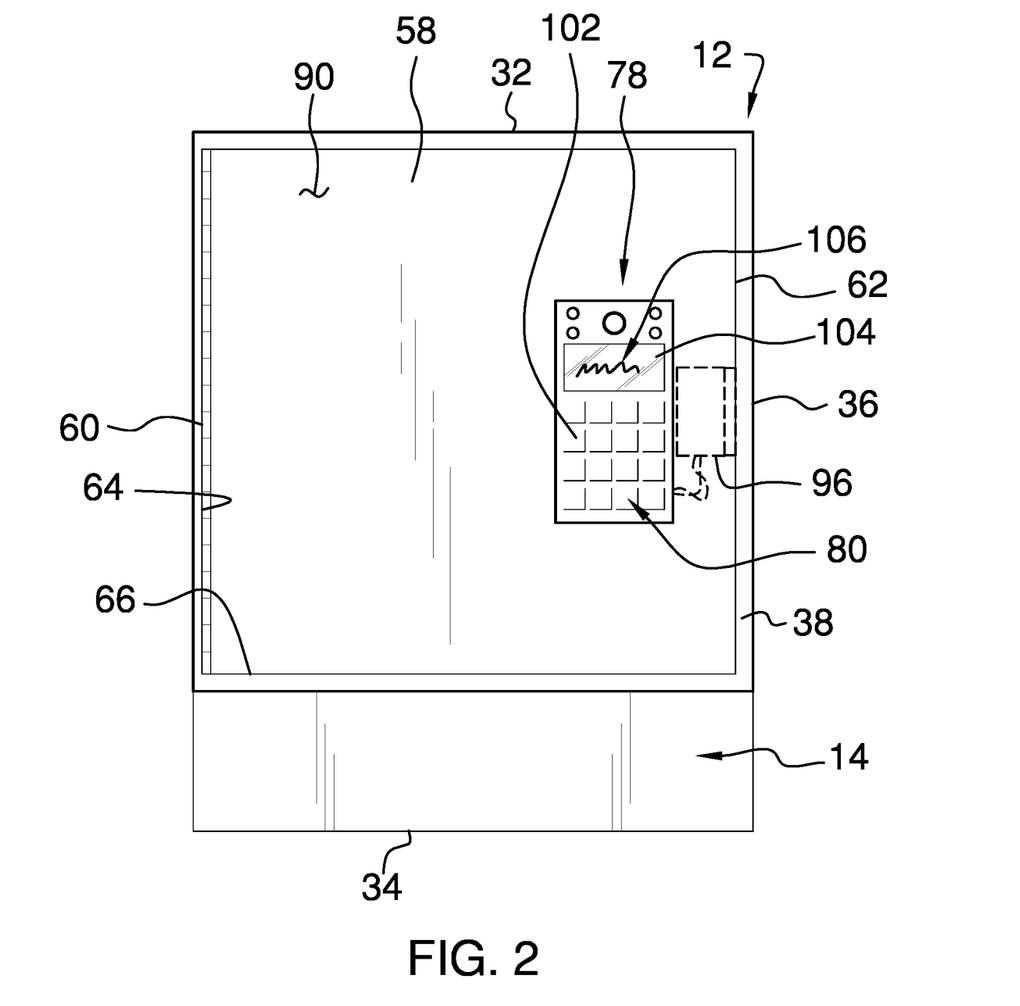
FIG. 2 is a front phantom view of an embodiment of the disclosure.
Figure 3:
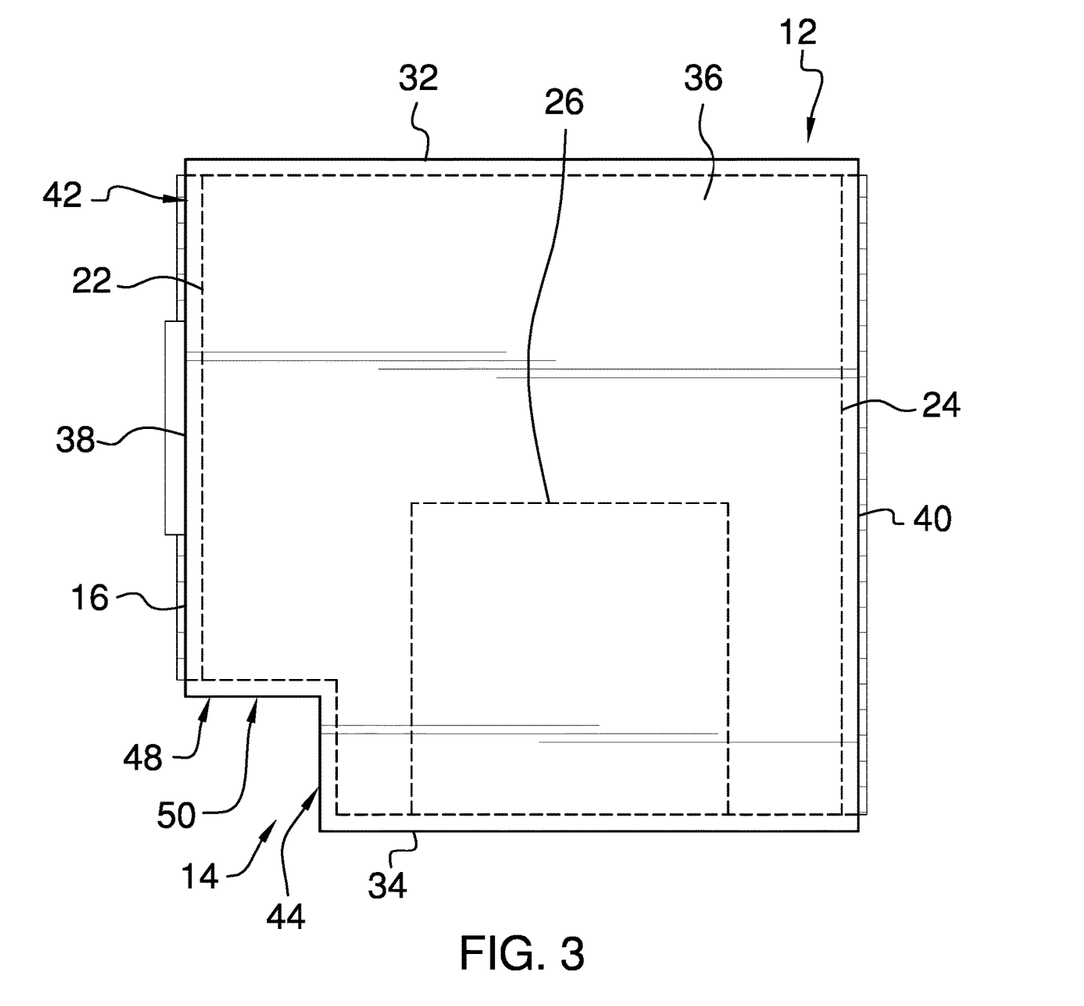
FIG. 3 is a left side phantom view of an embodiment of the disclosure.
Figure 4:
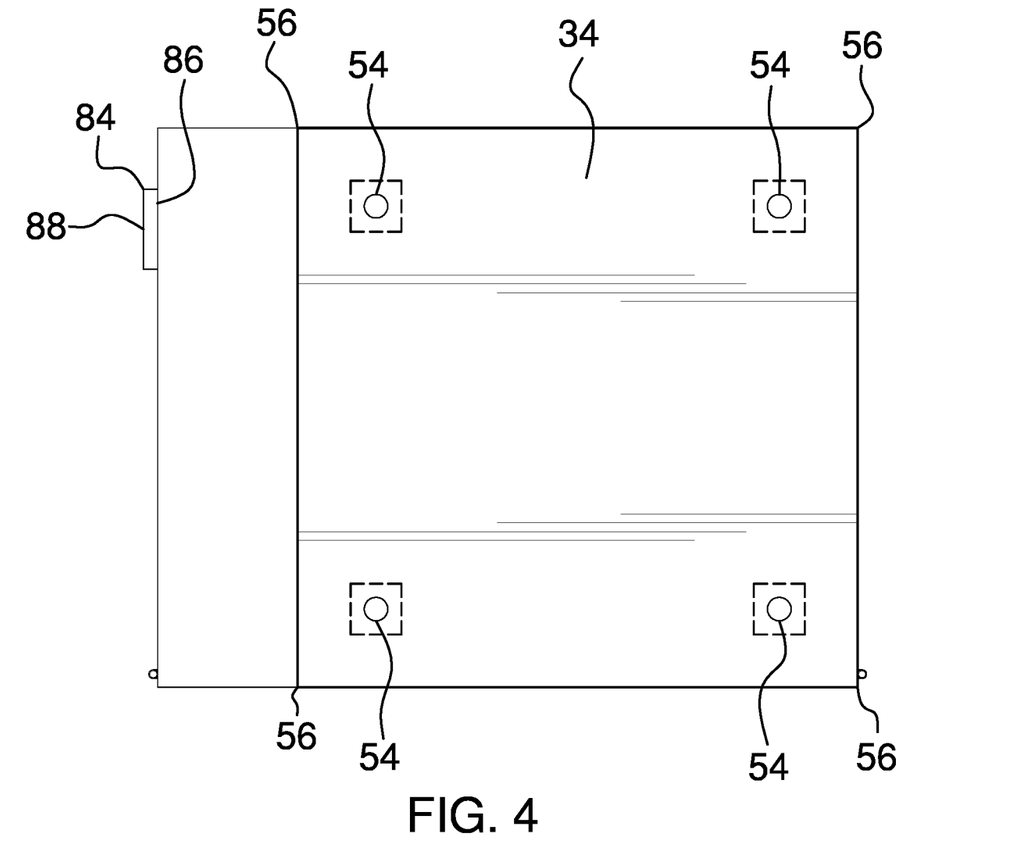
FIG. 4 is a bottom view of an embodiment of the disclosure.
Figure 5:
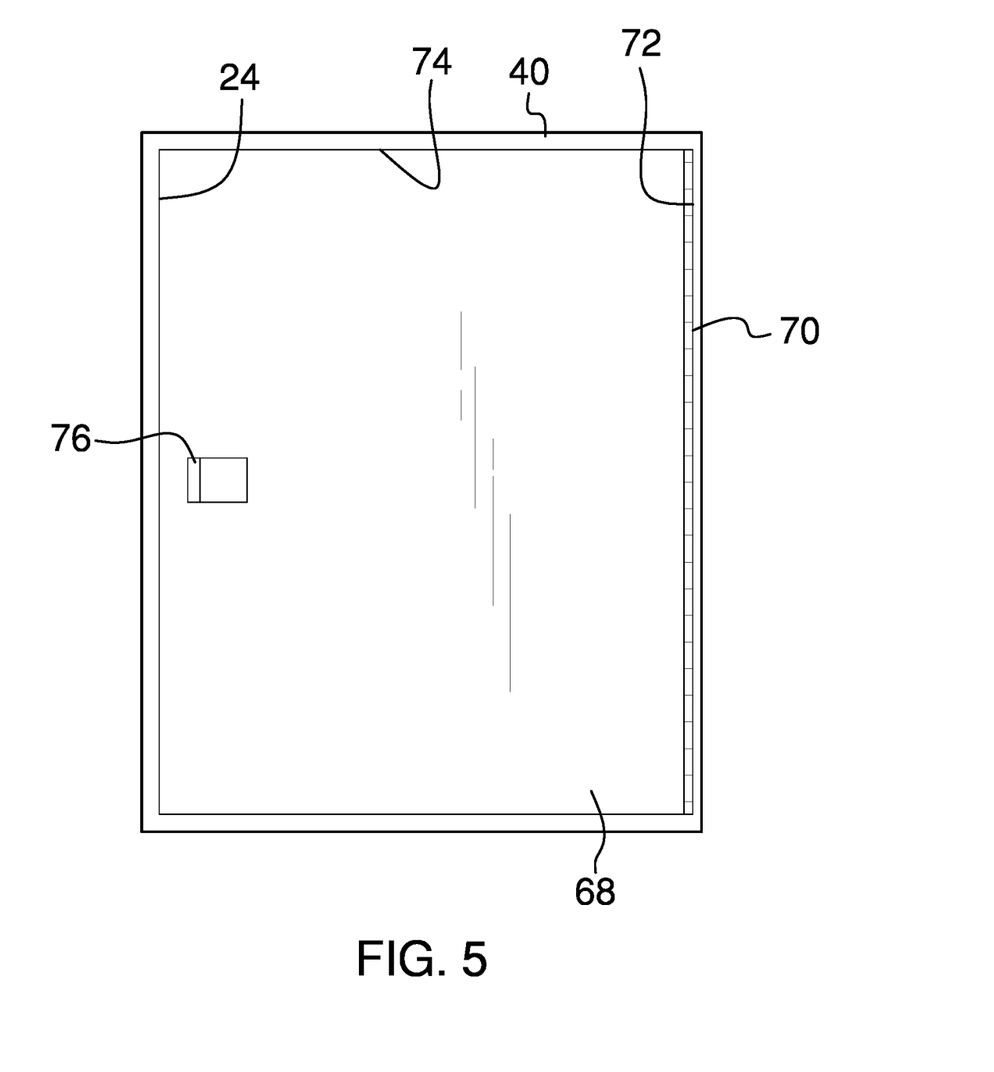
FIG. 5 is a back view of an embodiment of the disclosure.
Figure 6:
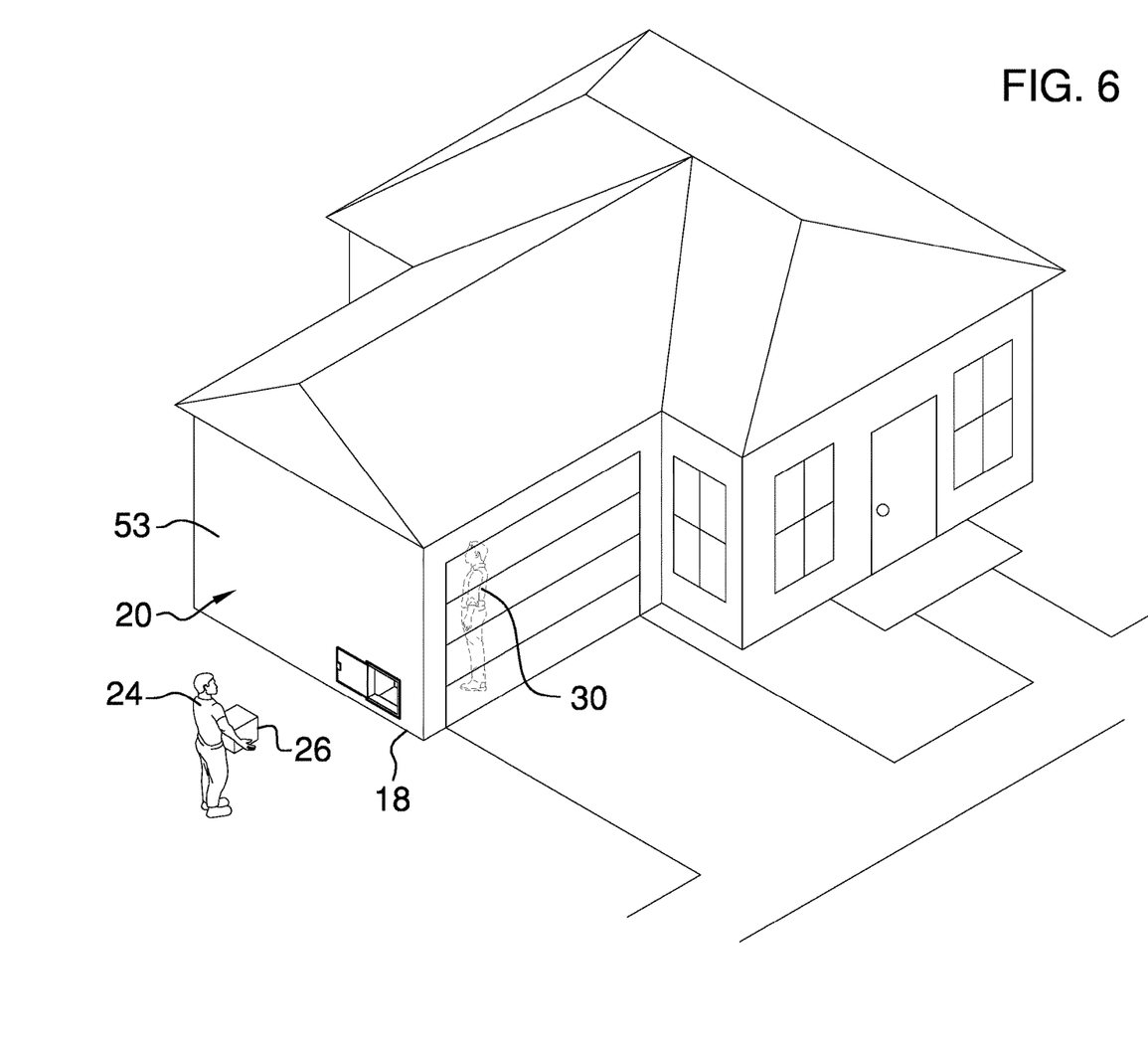
FIG. 6 is a perspective in-use view of an embodiment of the disclosure.
Figure 7:
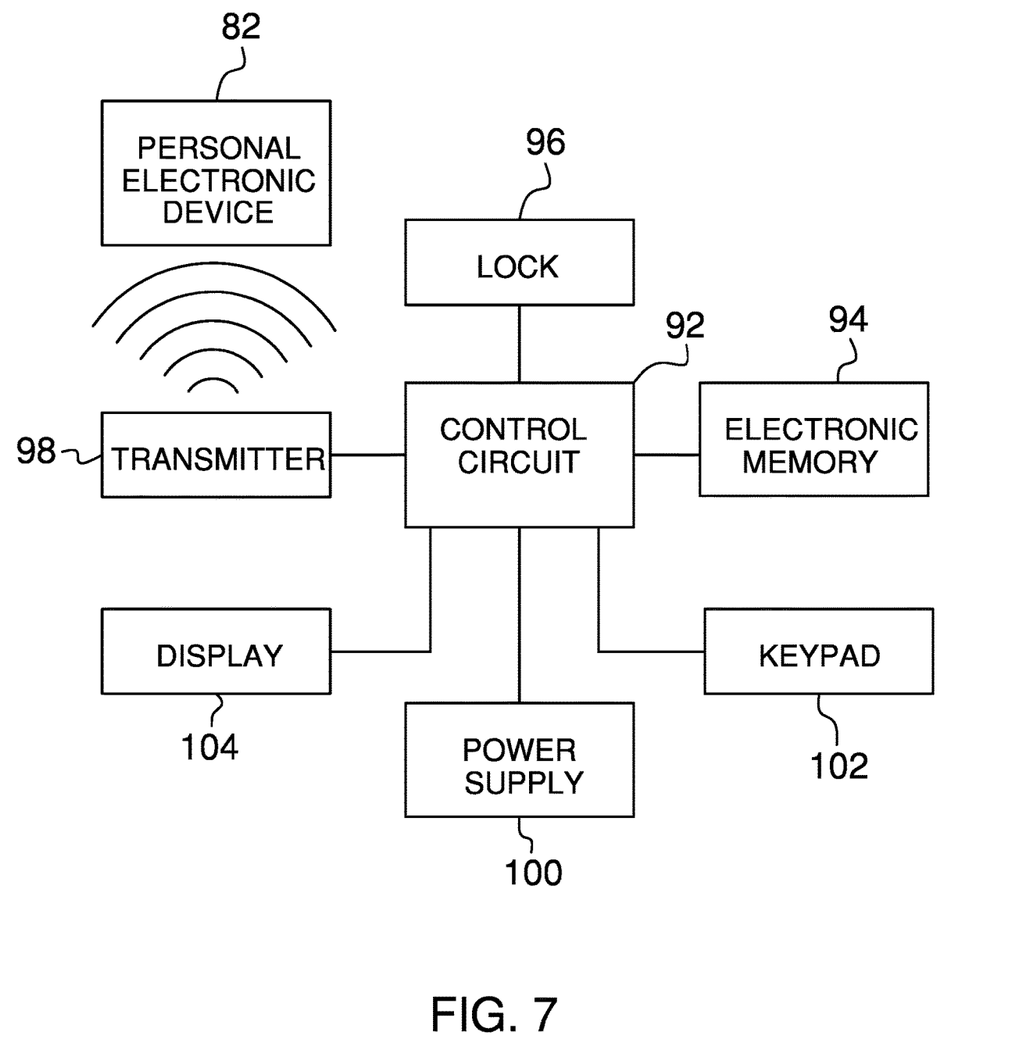
FIG. 7 is a schematic view of an embodiment of the disclosure.
Figure 8:
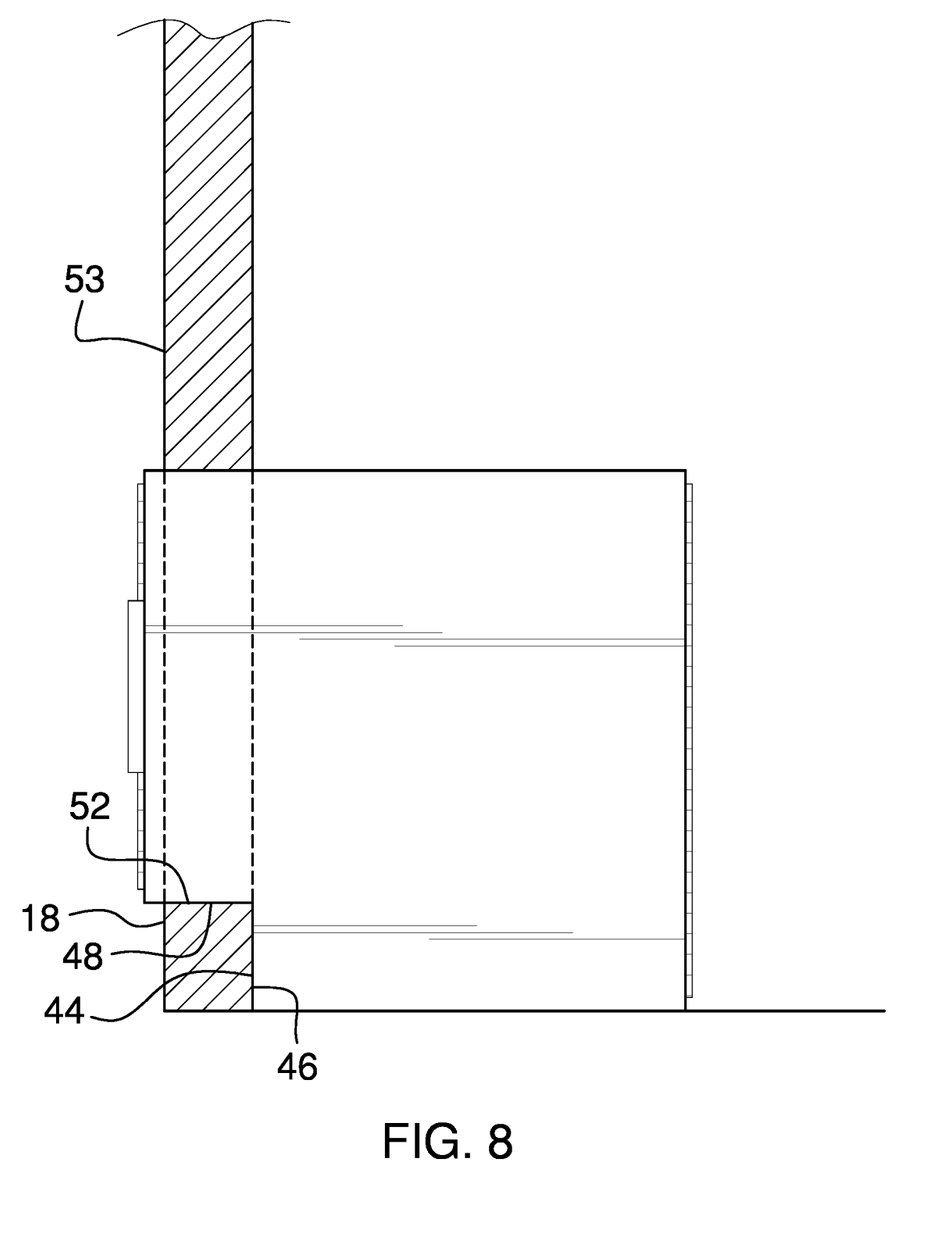
FIG. 8 is a cut-away in-use view of an embodiment of the disclosure.

With reference now to the drawings, and in particular to FIGS. 1 through 8 thereof, a new lockbox device embodying the principles and concepts of an embodiment of the disclosure and generally designated by the reference numeral 10 will be described.

As best illustrated in FIGS. 1 through 8, the delivery lockbox assembly 10 generally comprises a lock box 12 that has a recess 14 integrated into a front side 16 of the lock box 12 to accommodate a foundation 18 of a building 20. The building 20 may be a garage of a house or other type of building that would commonly receive a parcel delivery. The lock box 12 has a front entry 22 and the front entry 22 is positioned outside of the building 20 thereby facilitating a delivery person 24 to deliver a parcel 26 into the lock box 12. The lock box 12 has a back entry 28 and the back entry 28 is positioned within the building 20. In this way the back entry 28 is accessible to an occupant 30 of the building 20 for retrieving the parcel 26.

The lock box 12 has a top wall 32, a bottom wall 34 and an outer wall 36 extending between the top wall 32 and the bottom wall 34, and the outer wall 36 has a front side 38 and a back side 40. The front side 38 has a first portion 42 extending downwardly from the top wall 32 and the front side 38 has a second portion 44 extending between the first portion 42 and the bottom wall 34. The second portion 44 is spaced rearwardly from the first portion 42 such that the second portion 44 defines the recess 14. Moreover, the second portion 44 rests against a vertical wall 46 of the foundation 18. The front side 38 has a third portion 48 extending between the first portion 42 and the second portion 44 such that the third portion 48 defines an upper threshold 50 of the recess 14. Furthermore, the third portion 48 rests on a top surface 52 of the foundation 18 and the first portion 42 extends through an exterior wall 53 of the building 20. The third portion 48 is positioned closer to the bottom wall 34 than the top wall 32.

The front entry 22 extends through the front side 38 to access an interior of the lock box 12. The front entry 22 is positioned outside of the building 20 thereby facilitating the front entry 22 to be accessible to the delivery person 24. The back entry 28 extends through the back side 40 to access the interior of the lock box 12. In this way the back entry 28 is accessible to the occupant 30 of the building 20. A plurality of feet 54 is each coupled to the bottom wall 34 of the lock box 12 such that each of the feet 54 rests on a support surface. Additionally, each of the feet 54 is aligned with a respective one of four corners 56 of the bottom wall 34 of the lock box 12.

A front door 58 is hingedly integrated into the lock box 12 and the front door 58 is aligned with the front entry 22 for opening and closing the front entry 22. The front door 58 has a first lateral edge 60 and a second lateral edge 62, and the first lateral edge 60 that is hingedly coupled to a first lateral side 64 of a bounding edge 66 of the front entry 22. A back door 68 is hingedly integrated into the lock box 12 and the back door 68 is aligned with the back entry 28 for opening and closing the back entry 28. The back door 68 has a first lateral edge 70 that is hingedly coupled to a first lateral side 72 of a bounding edge 74 of the back entry 28. A handle 76 is integrated into the back door 68 and the handle 76 can be gripped by the occupant 30 thereby facilitating the occupant 30 to open and close the back door 68. Moreover, the handle 76 is recessed into an exposed surface of the back door 68.

A locking unit 78 is integrated into the front door 58 and the locking unit 78 engages the lock box 12 when the front door 58 is closed for inhibiting the front door 58 from being opened. The locking unit 78 inhibits the parcel 26 from being removed from the lock box 12 by an unauthorized person. The locking unit 78 has an access unit 80 which is integrated into the locking unit 78 such that the access unit 80 can be manipulated by the delivery person 24. The locking unit 78 is actuated into an unlocked condition to facilitate the front door 58 to be opened when a pre-determined access code is entered into the access unit 80. In this way the access unit 80 facilitates the delivery person 24 to deliver the parcel 26 into the lock box 12.

The locking unit 78 is in remote communication with a personal electronic device 82. The locking unit 78 broadcasts a delivery signal to the personal electronic device 82 when the front door 58 is opened. In this way the locking unit 78 alerts the occupant 30 that the parcel 26 has been delivered into the lock box 12. The personal electronic device 82 may be a smart phone, a personal computer or other type of electronic device that has wireless communication capabilities.

The locking unit 78 comprises a housing 84 that has a back wall 86 and a front wall 88, and the back wall 86 is coupled to a front surface 90 of the front door 58. The locking unit 78 includes a control circuit 92 that is integrated into the housing 84. The control circuit 92 receives an unlock input and the control circuit 92 includes an electronic memory 94 which stores the pre-determined access code. The locking unit 78 includes a lock 96 that is integrated into the front door 58 and the lock 96 is electrically coupled to the control circuit 92. Additionally, the lock 96 is positioned adjacent to the second lateral edge 62. The lock 96 is normally actuated into a locking condition having the lock 96 engaging the front side 38 of the outer wall 36 thereby inhibiting the front door 58 from being opened. Conversely, the lock 96 is actuated into an unlocked condition when the control circuit 92 receives the unlock input such that the lock 96 disengaging the front side 38 of the outer wall 36 thereby facilitating the front door 58 to be opened. The lock 96 may comprise an electro-mechanical lock or other type of mechanism that can mechanically engage and disengage the lock box 12.

The locking unit 78 includes a transmitter 98 that is integrated into the housing 84 and the transmitter 98 is electrically coupled to the control circuit 92. The transmitter 98 is in wireless communication with the personal electronic device 82. Furthermore, the transmitter 98 broadcasts the delivery signal when the control circuit 92 receives the unlock input. The transmitter 98 may comprise a radio frequency transmitter or the like. The locking unit 78 includes a power supply 100 that is integrated into the housing 84. The power supply 100 is electrically coupled to the control circuit 92 and the power supply 100 comprising at least one battery.

The access unit 80 comprises a keypad 102 that is integrated into the front wall 88 of the housing 84 such that the keypad 102 can be manipulated by the delivery person 24. The keypad 102 is electrically coupled to the control circuit 92 and the control circuit 92 receives the unlock input when the pre-determined access code is entered into the keypad 102. The access unit 80 includes a display 104 that is integrated into the front wall 88 of the housing 84 such that the display 104 is visible to the delivery person 24. The display 104 is electrically coupled to the control circuit 92 and the display 104 displays indicia 106 comprising alphanumeric characters corresponding to alphanumeric characters entered with the keypad 102. The display 104 may comprise a liquid crystal display or other type of electronic display.

The lock box 12 might include a refrigeration unit for cooling an interior of the lock box. In this way the lock box 12 can store a perishable food delivery. The lock box 12 may be integrated into the building 20 during construction of the building 20. Conversely, the lock box 12 may be installed in the building 20 after the building 20 has been constructed.

In use, the pre-determined code is communicated to the delivery person 24 prior to the delivery person 24 delivering the parcel 26 to the building 20. The delivery person 24 enters the pre-determined code with the keypad 102 and the lock 96 is actuated to disengage the lock box 12. In the way the delivery person 24 can open the front door 58 to deliver the parcel 26 into the lock box 12. Moreover, the transmitter 98 broadcasts the delivery signal to the personal electronic device 82 to notify the occupant 30 of the building 20 that the parcel 26 has been delivered. The delivery person 24 closes the front door 58 to secure the parcel 26 in the lock box 12. In this way the occupant 30 of the building 20 can subsequently open the back door 68 to retrieve the parcel 26 from the lock box 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A delivery lockbox assembly for securing a parcel delivery to a residence, said assembly comprising:
   a lock box having a recess integrated into a front side of said lock box wherein said recess is configured to accommodate a foundation of a building, said lock box having a front entry wherein said front entry is configured to be positioned outside of the building thereby facilitating a delivery person to deliver a parcel into said lock box, said lock box having a back entry, wherein said back entry is configured to be positioned within the building thereby facilitating said back entry to be accessible to an occupant of the building for retrieving the parcel, said lock box having a top wall, a bottom wall and an outer wall extending between said top wall and said bottom wall, said outer wall having a front side and a back side, said front side having a first portion extending downwardly from said top wall, said front side having a second portion extending between said first portion and said bottom wall, said second portion being spaced rearwardly from said first portion such that said second portion defines said recess wherein said second portion is configured to rest against a vertical wall of the foundation, said front side having a third portion extending between said first portion and said second portion such that said third portion defines an upper threshold of said recess wherein said third portion is configured to rest on a top surface of the foundation having said first portion extending through an exterior wall of the building, said third portion being positioned closer to said bottom wall than said top wall, said front entry extending through said front side to access an interior of said lock box wherein said front entry is configured to be positioned outside of the building thereby facilitating said front entry to be accessible to a delivery person, said back entry extending through said back side to access said interior of said lock box wherein said back entry is configured to be accessible to an occupant of the building;
   a plurality of feet, each of said feet being coupled to said bottom wall of said lock box wherein each of said feet is configured to rest on a support surface, each of said feet being aligned with a respective one of four corners of said bottom wall of said lock box;
   a front door being hingedly integrated into said lock box, said front, door being aligned with said front entry for opening and closing said front entry, said front door having a first lateral edge and a second lateral edge, said first lateral edge being hingedly coupled to a first lateral side of a bounding edge of said front entry;
   a back door being hingedly integrated into said lock box, said back door being aligned with said back entry for opening and closing said back entry, said back door having a first lateral edge being hingedly coupled to a first lateral side of a bounding edge of said back entry;
   a handle being integrated into said back door wherein said handle is configured to be gripped by the occupant thereby facilitating the occupant to open and close said back door, said handle being recessed into an exposed surface of said back door;
   a locking unit being integrated into said front door, said locking unit engaging said lock box when said front door is closed for inhibiting said front door from being opened wherein said locking unit is configured to inhibit the parcel from being removed from said lock box by an unauthorised person, said locking unit having an access unit being integrated into said locking unit wherein said access unit is configured to be manipulated by the delivery person, said locking unit being actuated into an unlocked condition to facilitate said front door to be opened when a pre-determined access code is entered into said access unit wherein said access unit is configured to facilitate the delivery person to deliver the parcel into said lock box, said locking unit being in remote communication with a personal electronic device, said locking unit broadcasting a delivery signal to the personal electronic device when said front door is opened wherein said locking unit is configured to alert the occupant that the parcel has been delivered into said lock box, said locking unit comprising:
      a housing having a back wall and a front wall, said back wall being coupled to a front surface of said front, door;
      a control circuit being integrated into said housing, said control circuit receiving an unlock input, said control circuit including an electronic memory storing said pre-determined access code;
      a lock being integrated into said front door, said lock being electrically coupled to said control circuit, said lock being normally actuated into a locking condition having said lock engaging said front side of said outer wall thereby inhibiting said front door from being opened, said lock being actuated into an unlocked condition when said control circuit receives said unlock input having said lock disengaging said front side of said outer wall thereby facilitating said front door to be opened;
      a transmitter being integrated into said housing, said transmitter being electrically coupled to said control circuit, said transmitter being in wireless communication with the personal electronic device, said transmitter broadcasting said delivery signal when said control circuit receives said unlock input; and a power supply being integrated into said housing, said power supply being electrically coupled to said control circuit, said power supply comprising at least one battery; and said access unit comprising:
 a keypad being integrated into said front wall of said housing wherein said keypad is configured to be manipulated by the delivery person, said keypad being electrically coupled to said control circuit, said control circuit receiving said unlock input when said pre-determined access code is entered into said keypad; and
 a display being integrated into said front wall of said housing wherein said display is configured to be visible to the delivery person, said display being electrically coupled to said control circuit, said display displaying indicia comprising alphanumeric characters corresponding to alphanumeric characters entered with said keypad.

2. A delivery lockbox system for securing a parcel delivery to a residence, said system comprising:
 a building having a foundation and an exterior wall;
 a lock box having a recess integrated into a front side of said lock box to accommodate said foundation of said building, said lock box having a front entry such that said front entry is positioned outside of said building wherein said front entry is configured to facilitate a delivery person to deliver a parcel into said lock box, said lock box having a back entry such that said back entry is positioned within said building wherein said back entry is configured to be accessible to an occupant of said building for retrieving the parcel, said lock box having a top wall, a bottom wall and an outer wall extending between said top wall and said bottom wall, said outer wall having a front side and a back side, said front side having a first portion extending downwardly from said top wall, said front side having a second portion extending between said first portion and said bottom wall, said second portion being spaced rearwardly from said first portion such that said second portion defines said recess, said second portion resting against a vertical wall of said foundation, said front side having a third portion extending between said first portion and said second portion such that said third portion defines an upper threshold of said recess, said third portion resting on a top surface of said foundation having said first portion extending through said exterior wall of said building, said third portion being positioned closer to said bottom wall than said top wall, said front entry extending through said front side to access an interior of said lock box such that said front entry is positioned outside of said building wherein said front entry is configured to be accessible to a delivery, person, said back entry extending through said back side to access said interior of said lock box wherein said back entry is configured to be accessible to an occupant of the building;
 a plurality of feet, each of said feet being coupled to said bottom wall of said lock box wherein each of said feet is configured to rest on a support surface, each of said feet being aligned with a respective one of four corners of said bottom wall of said lock box;
 a front door being hingedly integrated into said lock box, said front door being aligned with said front entry for opening and closing said front entry, said front, door having a first lateral edge and a second lateral edge, said first lateral edge being hingedly coupled to a first lateral side of a bounding edge of said front entry;
 a back door being hingedly integrated into said lock box, said back door being aligned with said back entry for opening and closing said back entry, said back door having a first lateral edge being hingedly coupled to a first lateral side of a bounding edge of said back entry;
 a handle being integrated into said back door wherein said handle is configured to be gripped by the occupant thereby facilitating the occupant to open and close said hack door, said handle being recessed into an exposed surface of said back door;
 a locking unit being integrated into said front door, said locking unit engaging said lock box when said front door is closed for inhibiting said front door from being opened wherein said locking unit is configured to inhibit the parcel from being removed from said lock box by an unauthorized person, said locking unit, having an access unit being integrated into said locking unit wherein said access unit is configured to be manipulated by the delivery person, said locking unit being actuated into an unlocked condition to facilitate said front door to be opened when a pre-determined access code is entered into said access unit wherein said access unit is configured to facilitate the delivery person to deliver the parcel into said lock box, said locking unit being in remote communication with a personal electronic device, said locking unit broadcasting a delivery signal to the personal electronic device when said front door is opened wherein said locking unit is configured to alert the occupant that, the parcel has been delivered into said lock box, said locking unit comprising:
 a housing having a back wall and a front wall, said back wall being coupled to a front surface of said front door;
 a control circuit being integrated into said housing, said control circuit receiving an unlock input, said control circuit including an electronic memory storing said pre-determined access code;
 a lock being integrated into said housing, said lock being electrically coupled to said control circuit, said lock being normally actuated into a locking condition having said lock engaging said front side of said outer wall thereby inhibiting said front door from being opened, said lock being actuated into an unlocked condition when said control circuit receives said unlock input having said lock disengaging said front side of said outer wall thereby facilitating said front door to be opened;
 a transmitter being integrated into said housing, said transmitter being electrically coupled to said control circuit, said transmitter being in wireless communication with the personal electronic device, said transmitter broadcasting said delivery signal when said control circuit receives said unlock input; and
 a power supply being integrated into said housing, said power supply being electrically coupled to said control circuit, said power supply comprising at least one battery; and said access unit comprising:
 a keypad being integrated into said front wall of said housing wherein said keypad is configured to be manipulated by the delivery person, said keypad being electrically coupled to said control circuit, said control circuit receiving said unlock input when said pre-determined access code is entered into said keypad; and a display being integrated into said front wall of said housing wherein said display is configured to be visible to the delivery person, said display being electrically coupled to said control circuit, said display displaying indicia comprising alphanumeric characters corresponding to alphanumeric characters entered with said keypad.

* * * * *